US010908549B2

(12) United States Patent
Yamaguchi

(10) Patent No.: US 10,908,549 B2
(45) Date of Patent: Feb. 2, 2021

(54) DRIVE FORCE TRANSMISSION MECHANISM AND IMAGE FORMING APPARATUS

(71) Applicant: KYOCERA Document Solutions Inc., Osaka (JP)

(72) Inventor: Akihiro Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/800,637

(22) Filed: Feb. 25, 2020

(65) Prior Publication Data
US 2020/0285187 A1    Sep. 10, 2020

(30) Foreign Application Priority Data

Mar. 6, 2019   (JP) ................. 2019-040477

(51) Int. Cl.
| F16H 7/02 | (2006.01) |
| B21D 53/14 | (2006.01) |
| G03G 15/20 | (2006.01) |
| G03G 15/00 | (2006.01) |
| F16H 7/18 | (2006.01) |

(52) U.S. Cl.
CPC ............ *G03G 15/757* (2013.01); *F16H 7/02* (2013.01); *F16H 7/18* (2013.01)

(58) Field of Classification Search
CPC ............ G03G 15/757; F16H 7/02; F16H 7/18
See application file for complete search history.

(56) References Cited

U.S. PATENT DOCUMENTS 9,334,931 B2    5/2016  Yamaguchi et al.
2014/0235384 A1*  8/2014  Yamaguchi .......... G03G 15/757
                                                        474/93

FOREIGN PATENT DOCUMENTS

JP      2014159865 A    9/2014
JP      2014159866 A    9/2014

* cited by examiner

*Primary Examiner* — Clayton E. LaBalle
*Assistant Examiner* — Michael A Harrison
(74) *Attorney, Agent, or Firm* — Studebaker & Brackett PC

(57) ABSTRACT

A drive force transmission mechanism includes a drive pulley, a driven pulley and an endless belt wound around the drive pulley and the driven pulley. The drive pulley and the driven pulley rotate around axes parallel to each other. At least one of the drive pulley and the driven pulley has a protruding part protruding outwardly in a radial direction around an outer circumferential face along an entire circumference. At least one axial end portion among both axial end portions of the protruding part in an axial direction of the rotational axis has a radius of curvature smaller than a radius of curvature of an axial center portion of the protruding part in the axial direction.

6 Claims, 4 Drawing Sheets

DRIVE FORCE TRANSMISSION MECHANISM AND IMAGE FORMING APPARATUS

INCORPORATION BY REFERENCE

This application is based on and claims the benefit of priority from Japanese patent application No. 2019-040477 filed on Mar. 6, 2019, which is incorporated by reference in its entirety.

BACKGROUND

The present disclosure relates to a drive force transmission mechanism which employs a belt to transmit a drive force, an image forming apparatus including the drive force transmission mechanism and a manufacturing method for the belt.

An electrophotographic type image forming apparatus is provided with a photosensitive drum as an image carrier. A device to transmit drive force to the photosensitive drum is conventionally configured such that a metal belt (for example, a belt made of stainless steel) is wound around a driven pulley on a motor side and a drive pulley on the photosensitive drum. As a configuration having the lowest cost and a high rigidity, a configuration that the belt is directly wound around an output shaft of the motor is known. In order to prevent the meandering of the belt, it is effective to form the one pulley into a crowing shape. However, there is a problem in which the belt is stretched owing to the use for a long time, the stable position of the belt is shifted from the center portion and then an uneven load is applied to the belt. This has adverse effect on durability of the pulley and the belt.

Then, a technique to suppress the meandering of the belt for a long period has been discussed. For example, there is a technique in which the pulley is formed to have different coefficient of linear expansion in the width direction and when the belt is shifted, an amount of expansion is adjusted to correct the meandering. Alternatively, there is a technique in which the meandering of the belt owing to the change of a circumferential length of the belt by heat expansion at endurable use is controlled by cooling the belt.

However, in a case where the pulley is formed to have different coefficient of linear expansion in the width direction, the manufacturing cost of the pulley may be increased. In a case where the belt is cooled, it is impossible to cope with the stretch of the belt by plastic deformation owing to the use for a long period.

SUMMARY

In accordance with an aspect of the present disclosure, a drive force transmission mechanism includes a drive pulley, a driven pulley and an endless belt wound around the drive pulley and the driven pulley. At least one of the drive pulley and the driven pulley has a protruding part protruding outwardly in a radial direction around an outer circumferential face along an entire circumference. At least one axial end portion among both axial end portions of the protruding part in an axial direction of the rotational axis has a radius of curvature smaller than a radius of curvature of an axial center portion of the protruding part in the axial direction.

In accordance with an aspect of the present disclosure, an image forming apparatus includes the drive force transmission mechanism and a photosensitive drum to be rotated by the drive force transmission mechanism.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, a printer 1 (an example of an image forming apparatus) and a drive force transmission mechanism 31 according to one embodiment of the present disclosure will be described with reference to the drawings.

Figure 1:
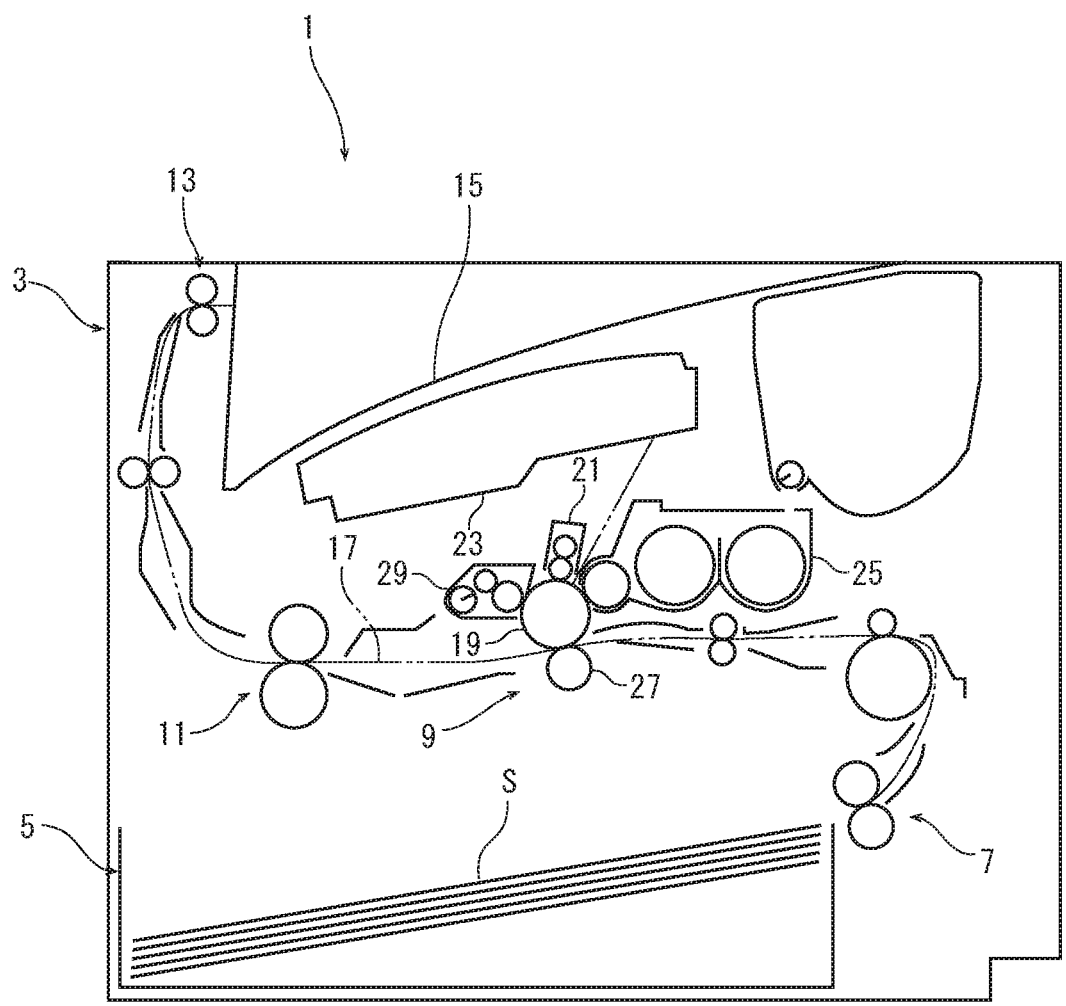
FIG. 1 is a front view schematically showing an inner structure of a printer according to one embodiment of the present disclosure.
Figure 1:
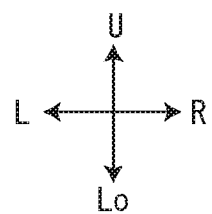

Firstly, with reference to FIG. 1, an entire structure of the printer 1 as an image forming apparatus will be described. FIG. 1 is a front view schematically showing an inner structure of the printer 1. In the following description, a near side (a front side) of a paper surface of FIG. 1 is defined to be a front side of the printer 1, and a left-and-right direction is defined based on a direction in which the printer 1 is viewed from the front side. In each figure, U, Lo, L, R, Fr and Rr respectively show an upper side, a lower side, a left side, a right side, a front side and a rear side.

An apparatus main body 3 of the printer 1 is provided with a sheet feeding cassette 5 in which a sheet S is stored, a sheet feeding device 7 which feeds the sheet S from the sheet feeding cassette 5, an image forming part 9 which forms a toner image on the sheet S, a fixing device 11 which fixes the toner image on the sheet S, a sheet discharge device 13 which discharges the sheet S and an discharge tray 15 on which the discharged sheet S is stacked. In the apparatus main body 3, a conveyance path 17 for the sheet S is formed from the sheet feeding device 7 through the image forming part 9 and the fixing device 11 to the sheet discharge device 13.

The image forming part 9 includes a photosensitive drum 19, a charge device 21, an exposure device 23, a development device 25, a transfer roller 27 and a cleaning device 29. The photosensitive drum 19 is driven by a drive force transmission mechanism 31 (refer to FIG. 2), described later, to be rotated in the clockwise direction in FIG. 1. The charge device 21, the development device 25, the transfer roller 27 and the cleaning device 29 are disposed around the photosensitive drum 19 in the order in the rotational direction of the photosensitive drum 19.

The sheet S fed by the sheet feeding device 7 from the sheet feeding cassette 5 is conveyed to the image forming part 9 along the conveyance path 17. In the image forming part 9, the photosensitive drum 19 is charged to a predetermined surface potential while driven by the drive force transmission mechanism 31 to be rotated. Then, the photosensitive drum 19 is exposed with the exposure device 23, and an electrostatic latent image is formed on the photosensitive drum 19. Next, the electrostatic latent image is developed to a toner image by the development device 25. Then, the toner image is transferred on the sheet S by the transfer roller 27. The sheet S to which the toner image is transferred is conveyed along the conveyance path 17 to the fixing device 11. The fixing device 11 fixes the toner image to the sheet S. The sheet S to which the toner image is fixed is discharged by the sheet discharge device 13 and then stacked on the discharge tray 15. The toner remaining on the surface of the photosensitive drum 19 is removed by the cleaning device 29.

Figure 2:
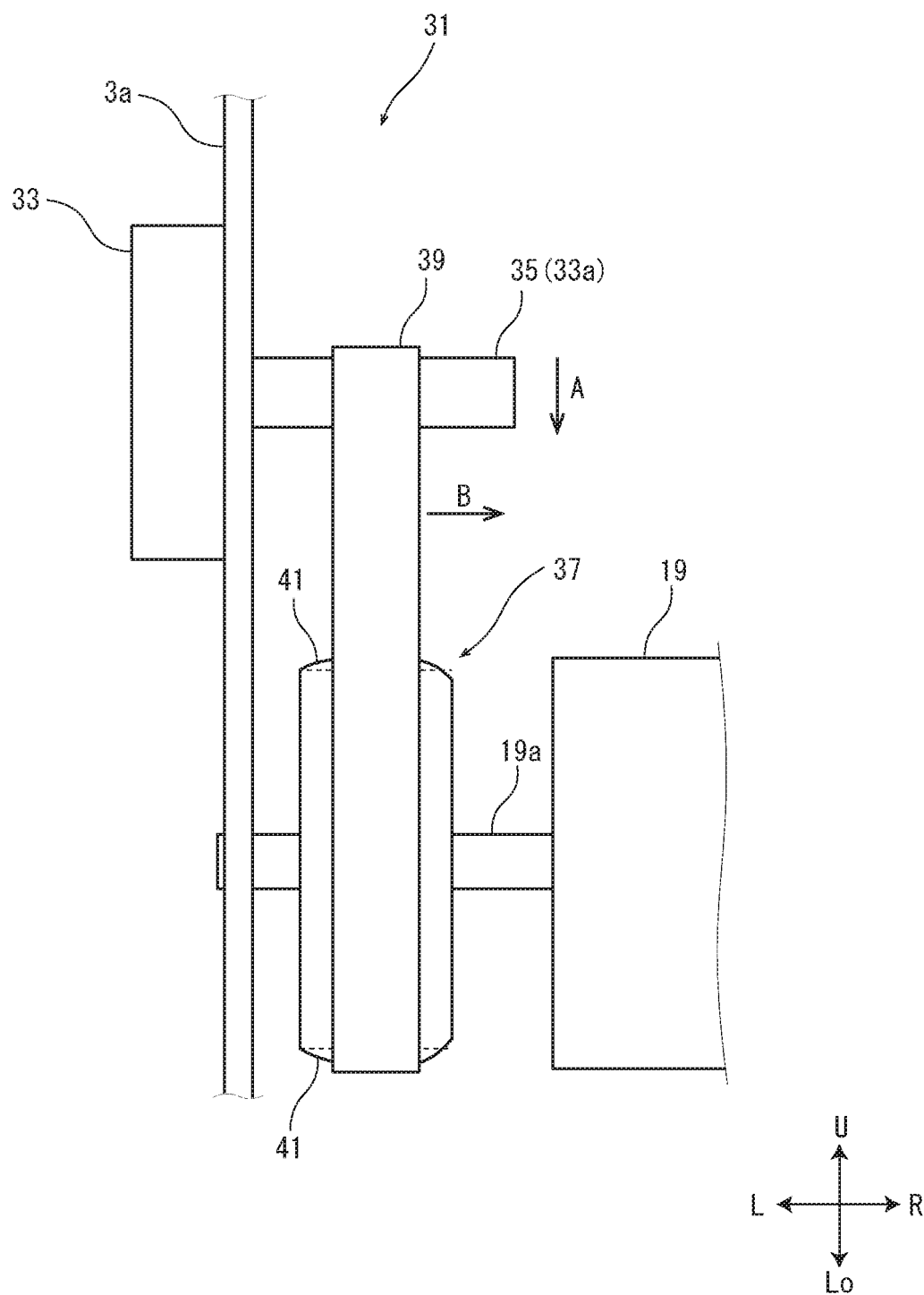
FIG. 2 is a side view showing a drive force transmission mechanism according to the embodiment of the present disclosure.
Figure 3:
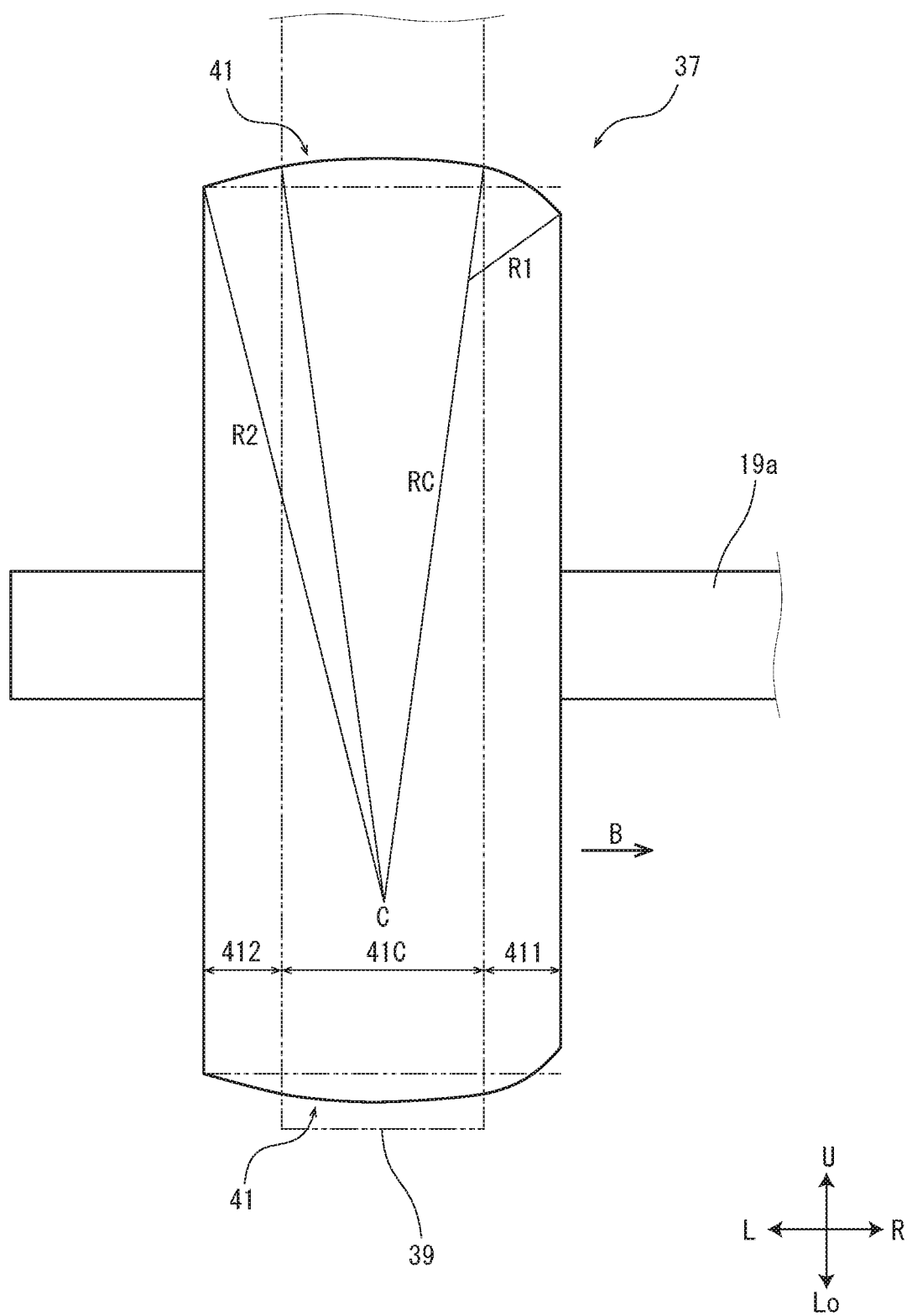
FIG. 3 is a side view showing a driven pulley in the drive force transmission mechanism according to the embodiment of the present disclosure.

Next, with reference to FIG. 2 and FIG. 3, the drive force transmission mechanism 31 will be described. FIG. 2 is a side view showing the drive force transmission mechanism 31 and FIG. 3 is a side view showing a driven pulley 37.

The drive force transmission mechanism 31 includes a motor 33 as a drive source, a drive pulley 35 driven by the motor 33, a driven pulley 37 and a belt 39 wound around both the drive pulley 35 and the driven pulley 37.

The motor 33 is fixed to a side plate 3a of the apparatus main body 3. An output shaft 33a of the motor 33 is protruded to the inside of the apparatus main body 3 through the side plate 3a.

In the present embodiment, the output shaft 33a of the motor 33 serves as the drive pulley 35. The drive pulley 35 is made of nonmagnetic material. In place of the configuration in which the output shaft 33a serves as the drive pulley 35, the drive pulley 35 different from the output shaft 33a may be fixed to the output shaft 33a of the motor 33.

The driven pulley 37 is fixed to an end portion of a rotational shaft 19a of the photosensitive drum 19. The rotational shaft 10a is parallel to the output shaft 33a, and the drive pulley 35 and the driven pulley 37 rotate around rotational axes parallel to each other. The driven pulley 37 is made of nonmagnetic material, and has a diameter larger than a diameter of the drive pulley 35. Around the outer circumferential face of at least one of the drive pulley 35 and the driven pulley 37, a protruding part 41 crowned so as to protrude outwardly in the radial direction is formed along the entire circumference. In the present embodiment, as shown in FIG. 3, the protruding part 41 is formed around the outer circumferential face of the driven pulley 37, however, the protruding part 41 may be formed around the circumferential face of the drive pulley 35.

The protruding portion 41 has a right side first axial end portion 411, a left side second axial end portion 412 and an axial center portion 41C in the axial direction of the rotational axis. The first axial end portion 411 has a radius of curvature R1 smaller than a radius of curvature RC of the axial center portion 41C. "C" shown in FIG. 3 is a center of curvature of the axial center portion 41C. The second axial end portion 412 has a radius of curvature R2 equal to a radius of curvature of the center portion RC. The axial center portion 41C has a width in the axial direction equal to a width of the belt 39 in the axial direction. The first axial end portion 411 and the second axial end portion 412 are outside the axial center portion 41C in the axial direction.

The belt 39 is a seamless endless belt. The belt 39 is made of nonmagnetic metal material, such as SUS 304 (austenitic stainless steel). The belt 39 is wound around the drive pulley 35 and the driven pulley 37.

Next, an operation of the drive force transmission mechanism 31 having the above described configuration will be described. When the motor 33 rotates the drive pulley 35, the belt 39 is circulated to transmit drive force to the driven pulley 37 and to rotate the photosensitive drum 19. In the protruding part 41 of the driven pulley 37, as the outer diameter becomes large, the circumferential speed becomes fast, and a force to return the belt 39 to the center is generated so that the meandering of the belt 39 is suppressed.

Here, because the belt 39 is applied with tension, the drive pulley 35 may be finely deflected in a direction in which the drive pulley 35 falls to a side of the driven pulley 37 (A direction in FIG. 2), in other words, the shaft tilting may occur. Then, conventionally, as the belt 39 is stretched owing to the use for a long time and its tension is lowered, the belt 39 is shifted rightward and the belt 39 is applied with an uneven load. As a result, the drive pulley 35 and the driven pulley 37 may be abraded or a durability of the belt 39 may have an adversary effect. Additionally, the belt 39 may be fallen off the drive pulley 35 and the driven pulley 37.

On the contrary, in the present embodiment, the right first axial end portion 411 (an example of the end portion on a side to which the belt 39 is shifted when the belt 39 is driven) among both the end portions of the protruding part 41 has a radius of curvature R1 larger than a radius of curvature RC of the axial center portion 41C. According to the configuration, a force to return the belt 39 to the center is larger in the first axial end portion 411 than in the axial center portion 41C.

As described above, according to the drive force transmission mechanism 31 of the present embodiment, it becomes possible to circulate the belt 39 around the center portions of the drive pulley 35 and the driven pulley 37 stably and to suppress the occurrence of the uneven load applied to the belt 39 surely.

According to the drive force transmission mechanism 31 of the present embodiment, the right first axial end portion 411 (an example of the end portion on a side to which the belt 39 is shifted when the belt 39 is driven) among both the end portions of the protruding part 41 has a radius of curvature R1 larger than a radius of curvature RC of the axial center portion 41C. Therefore, when the belt 39 is shifted to a side of the first axial end portion 411, it becomes possible to obtain effect in which the belt 39 is stably circulated around the center portions of the drive pulley 35 and the driven pulley 37 and the occurrence of the uneven load applied to the belt 39 is suppressed.

According to the drive force transmission mechanism 31 of the present embodiment, the axial center portion 41C has a width in the axial direction equal to a width of the belt 39 in the axial direction, and the first axial end portion 411 and the second axial end portion 412 are outside the axial center portion 41C in the axial direction so that when the belt 39 is sifted from the axial center portion 41C, it becomes possible to return the belt 39 to the axial center portion 41C.

According to the drive force transmission mechanism 31 of the present embodiment, the axial center portion 41C is crowned into an axially symmetrical shape, so that it becomes possible to circulate the belt 39 around the axial center portion 41C stably.

According to the drive force transmission mechanism 31 of the present embodiment, the second axial end portion 412 (an example of the end portion on a side to which the belt 39 is not shifted when the belt 39 is driven) has a radius of curvature R2 equal to a radius of curvature RC of the axial center portion 41C, so that it becomes possible to reduce an amount of working process for the driven pulley 37.

The above embodiment may be modified as follows.

Figure 4:
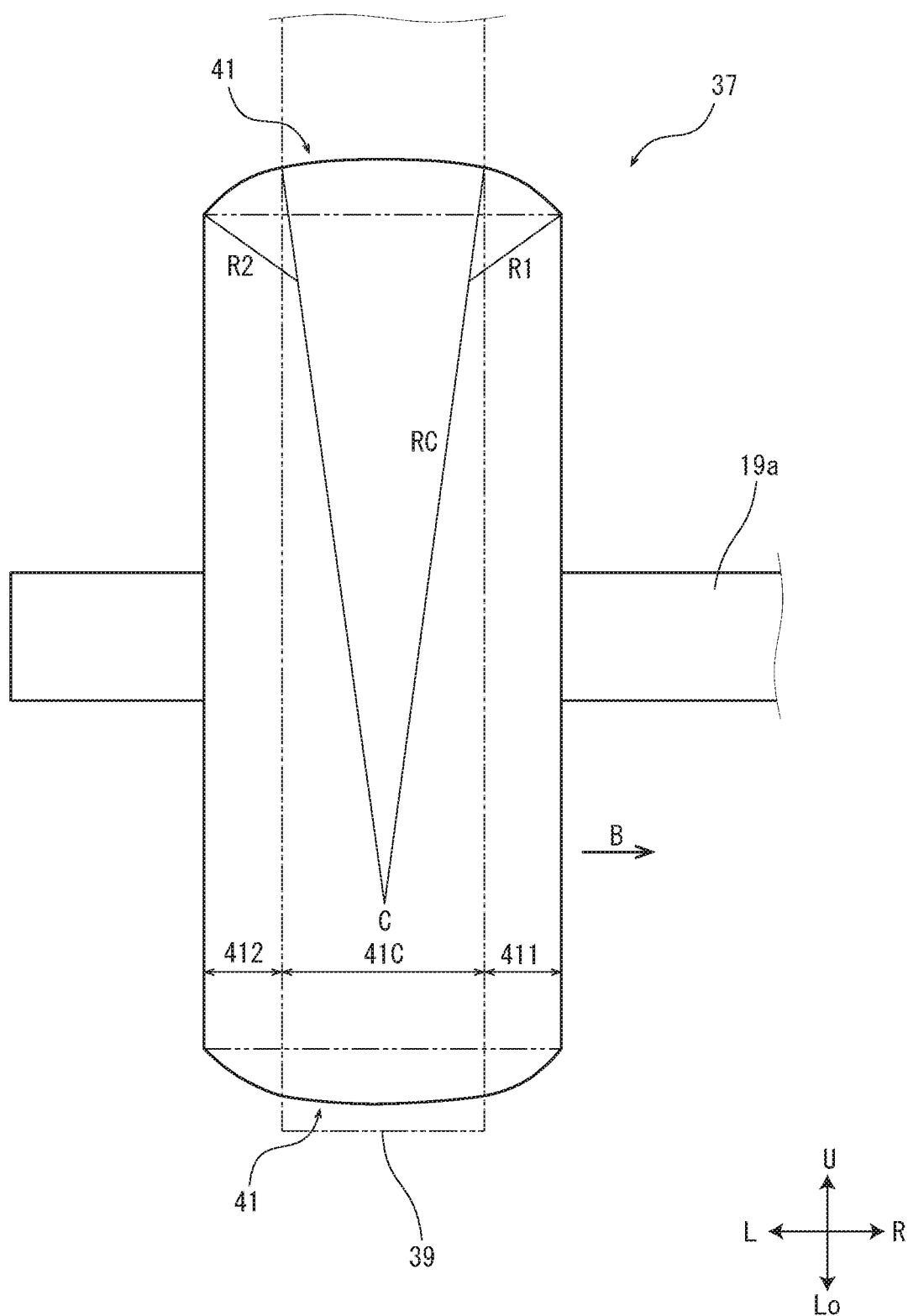
FIG. 4 is a side view showing the driven pulley of a modified example, in the drive force transmission mechanism according to the embodiment of the present disclosure.

FIG. 4 is a side view showing the driven pulley 37 of the modified example. In the example, the second axial end portion 412 has a radius of curvature R2 equal to a radius of curvature R1 of the first axial end portion 411. When the drive pulley 35 is fallen toward the driven pulley 37 and also fallen toward the front side or the rear side (in other words, an axial direction of the drive pulley 35 and an axial direction of the driven pulley 37 are in a twisted position), there is a possibility that the belt 39 is shifted to both the left and right sides. According to the modified example, even if the belt 39 is sifted to any side, it becomes possible to circulate the belt 39 around the center portions of the drive pulley 35 and the driven pulley 37 stably and to suppress the occurrence of the uneven load applied to the belt 39.

When the belt 39 is shifted to the right side, the second axial end portion 412 is not necessarily crowned. When the belt 39 is shifted to the left side, the first axial end portion 411 is not necessarily crowned.

The axial center portion 41C may have a width wider or narrower than a width of the belt 39.

The invention claimed is:

1. A drive force transmission mechanism comprising:
   a drive pulley and a driven pulley which rotate around rotational axes parallel to each other; and
   an endless belt wound around the drive pulley and the driven pulley, wherein
   at least one of the drive pulley and the driven pulley has a protruding part protruding outwardly in a radial direction around an outer circumferential face along an entire circumference, and
   an axial end portion on a side to which the belt is shifted when the belt is driven, among both axial end portions of the protruding part in an axial direction of the rotational axis, has a radius of curvature smaller than a radius of curvature of an axial center portion of the protruding part in the axial direction, and an opposite axial end portion has a radius of curvature equal to the radius of curvature of the axial center portion.

2. The drive force transmission mechanism according to claim 1, wherein
   the drive pulley is a cantilever rotational shaft,
   the protruding part is formed around the outer circumferential face of the driven pulley, and
   an axial end portion on a side of a free end portion of the rotational shaft, among both the axial end portions of the protruding part, has a radius of curvature smaller than a radius of curvature of the axial center portion, and an opposite axial end portion has a radius of curvature equal to the radius of curvature of the axial center portion.

3. The drive force transmission mechanism according to claim 1, wherein
   the axial center portion has a width in the axial direction equal to a width of the belt in the axial direction, and
   both the axial end portions are outside the axial center portion in the axial direction.

4. The drive force transmission mechanism according to claim 1, wherein
   the axial center portion is crowned into a symmetrical shape in the axial direction.

5. The drive force transmission mechanism according to claim 1, wherein
   the driven pulley has an outer diameter larger than an outer diameter of the drive pulley, and
   the protruding part is formed around the outer circumferential face of the driven pulley.

6. An image forming apparatus comprising:
   the drive force transmission mechanism according to claim 1; and
   a photosensitive drum to be rotated by the drive force transmission mechanism.

\* \* \* \* \*